June 24, 1930. G. L. FENNO 1,768,041
BEEHIVE
Filed Feb. 20, 1928 2 Sheets-Sheet 1
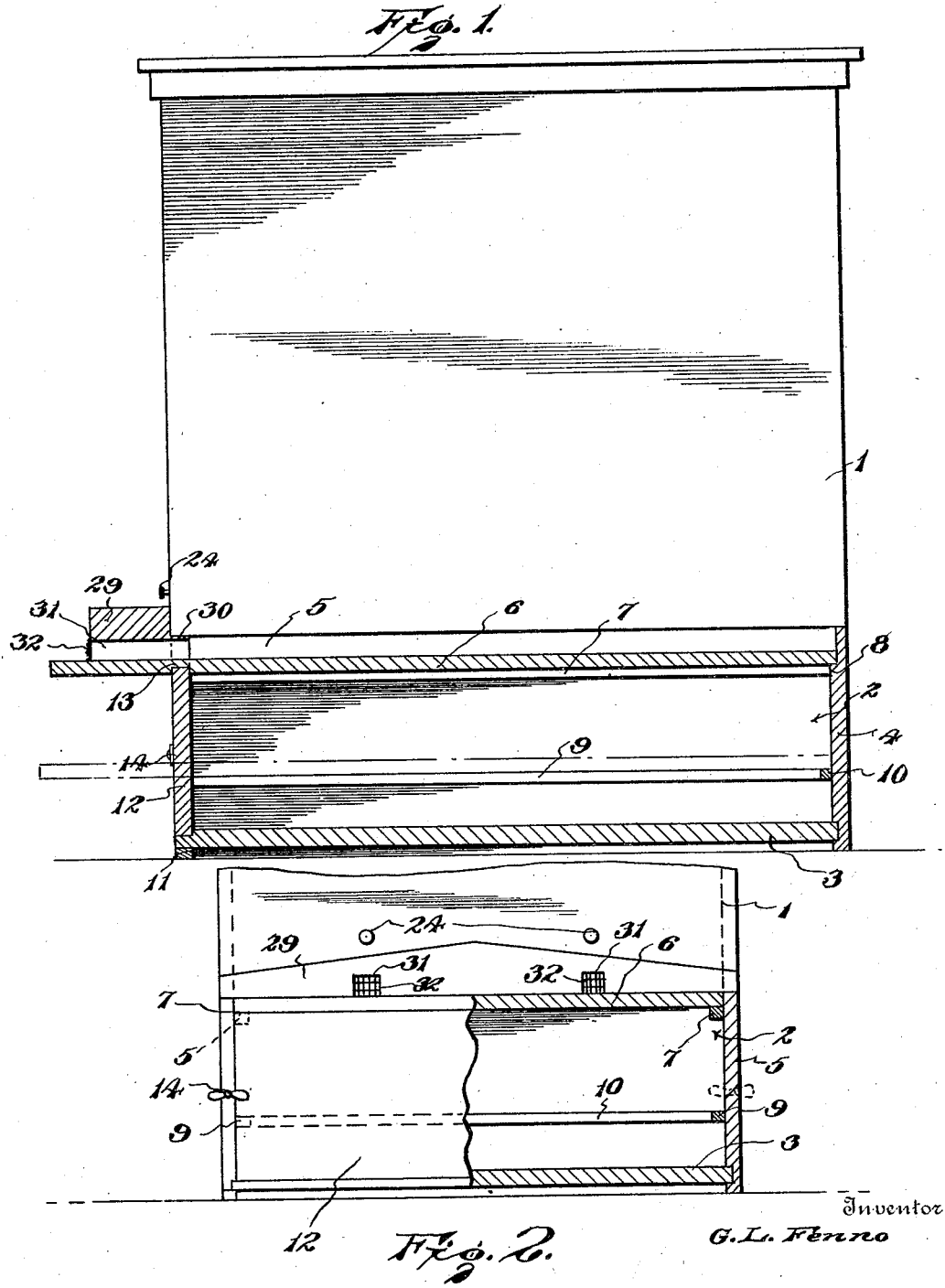

June 24, 1930.  G. L. FENNO  1,768,041
BEEHIVE
Filed Feb. 20, 1928    2 Sheets-Sheet 2
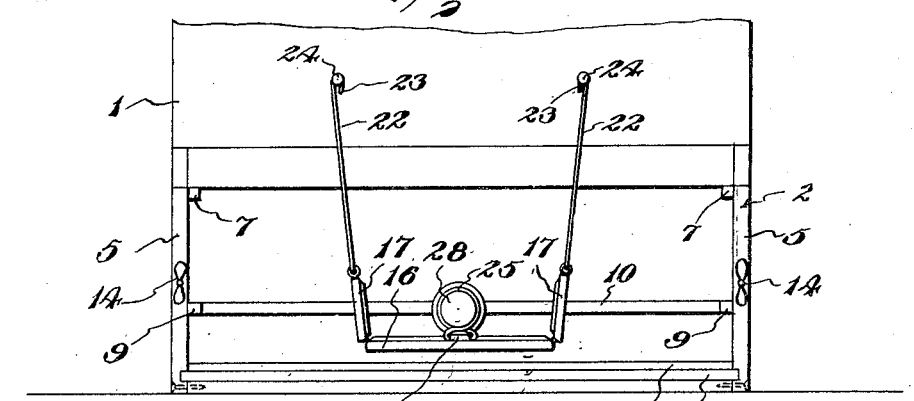
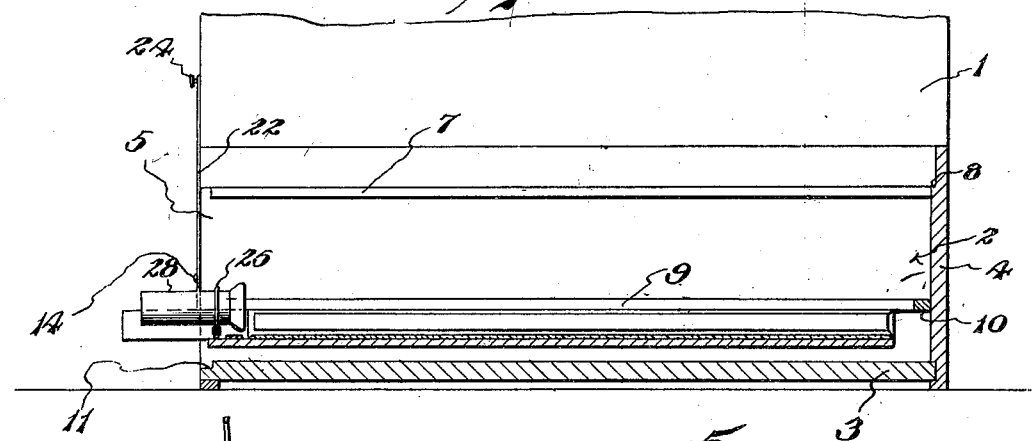
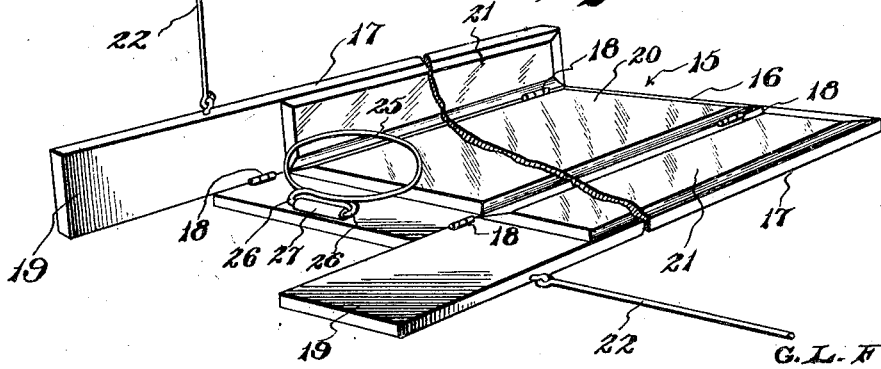
Inventor
G. L. Fenno
By Lacey & Lacey, Attorney.

Patented June 24, 1930

1,768,041

UNITED STATES PATENT OFFICE

GRACE LEE FENNO, OF PALOS PARK, ILLINOIS

BEEHIVE

Application filed February 20, 1928. Serial No. 255,829.

This invention relates to bee hives and more particularly to an improved base for a hive and also to a reflector and light holder which may be temporarily applied to the hive within the base in order to allow the interior of the hive to be illuminated and observed through the reflector and queen bee cells removed.

One object of the invention is to provide the hive with a base having greater depth than usual and seats therein spaced from each other vertically of the base so that a platform upon which the bees travel when entering or leaving the hive may be disposed close to or at some distance below the bottom of the hive and thereby allow the hive to be well ventilated and provide ample room for the bees to enter and leave the hive during the summer but prevent too much cold air entering the hive during the winter.

Another object of the invention is to allow the portion of the base below the platform to be tightly closed during the winter when the platform is disposed close to the bottom of the body of the hive.

Another object of the invention is to provide a reflector which may be readily inserted within the base when the platform is removed and so form the reflector that, when the hive is illuminated by a light carried by the reflector, comb in the lower portion of the body may be easily seen and surplus queen bee cells removed without its being necessary to dismantle the hive.

Another object of the invention is to permit the reflector to be suspended from the body of the hive and swung transversely thereof so that mirrors carried by the reflector may be moved into proper position to permit all of the comb in the lower portion of the body to be inspected.

The invention is illustrated in the accompanying drawings, wherein

Figure 1 is a view showing the improved hive in side elevation with its base in longitudinal section and closed for the winter;

Fig. 2 is a view showing the hive in front elevation and partially in transverse section;

Fig. 3 is a view showing the base and lower portion of the body of the hive in front elevation with the reflector in place;

Fig. 4 is a view showing the body of the hive in side elevation and the base and reflector in longitudinal section, and Fig. 5 is a perspective view of the reflector.

The hive includes a body portion 1 which is of a conventional construction and rests upon a base 2. The base is of greater depth than bases of an ordinary construction and includes a bottom 3, rear wall 4 and side walls 5. This base is open at its front and within the base there has been provided upper and lower seats upon either of which a platform 6 may be removably supported. The uper seat preferably consists of strips 7 which are secured against the side walls 5 longitudinally thereof with their rear ends flush with the surface of a ledge 8 formed by reducing the thickness of the upper portion of the rear wall 4 and the lower seat consists of similar strips 9 secured against the side walls in spaced relation to the upper strips and a strip 10 which is secured against the inner surface of the rear wall between the rear ends of the side strip. It will be understood that if desired a strip similar to the strip 10 could be employed in place of the shoulder 8 or grooves could be formed in the side and rear walls to take the place of the strips. It should be noted that the strips 7 and 9 terminate in spaced relation to the forward ends of the side walls and that the bottom 3 is reduced in thickness along its forward edge to provide a seat 11. Therefore, when the platform 6 is resting upon the upper strips 7, a removable front closure 12 may be set in place, as shown in Figs. 1 and 2, against the forward ends of the strips 7 and 9 with its lower edge portion resting in the seat 11 and its upper edge seated in a groove 13 formed in the under face of the platform. By this arrangement the front closure can be easily set in place and when the turn buttons or equivalent fasteners 14 carried by the side walls are moved to extend across the outer face of the front closure, as shown in Fig. 2, this closure will be securely held in place. Since the platform is of greater length than the base, it will project forwardly beyond the body and base and provide a very good landing stage for bees returning to the hive and also allow bees leaving the hive to easily take flight. During the winter the platform is supported upon the upper seat provided in the base and the front closure set in place, as shown in Figs. 1 and 2, but during the summer when the bees are working the front closure is removed and the platform withdrawn from the base and then reset upon the lower seat, as indicated by dotted lines in Fig. 1. When so disposed, the hive will be well ventilated and the bees allowed to freely enter and leave the hive but when the platform is resting upon the upper seat and the front closure in place only sufficient space will be provided between the platform and lower edge of the front wall of the body to prevent the bees from smothering.

When the queen bee lays eggs, a number of cells in the egg holding comb contain queen bee eggs and, in order to prevent too many queen bees from hatching, it is necessary to remove a certain number of the queen bee cells. This operation is ordinarily performed by dismantling the hive sufficient to allow the caretaker to remove surplus queen bee cells, but it has been found that this is tedious and requires a great deal of time. In order to allow the comb in the lower portion of the body in which the bees are hatched to be inspected without dismantling the hive, I have provided a reflector which is illustrated in Fig. 5 and indicated in general by the numeral 15. This reflector includes a center section 16 and side sections 17 which may be formed of strips of wood or any other suitable material and are pivotally connected by hinges 18. The center section is of greater width than the side sections and the side sections are of greater length than the center section and project forwardly therefrom, thereby providing handle portions 19 which may be grasped in order to permit the reflector to be moved transversely in the base and the sections thereof tilted relative to each other in order to allow all portions of the hives to be inspected. The center section 16 is of approximately the same length as the body and the mirrors 20 and 21 extend from the rear or inner ends of the sections to adjacent the forward edge of the center section. Therefore, when the reflector is thrust into the base after the platform has been removed, it will extend practically the full depth of the base and body and all of the hatching combs in the lower portion of the body may be observed through the mirrors. Strands 22 which may be formed of strong wire are carried by the side sections adjacent the plane of the outer or forward edge of the intermediate or center section, and these strands extend upwardly and terminate in hooks 23 at their free ends to be engaged about pins 24 which project forwardly from the front wall of the body in spaced relation to each other transversely thereof. By an inspection of Figs. 3 and 4, it will be readily seen that when the reflector is suspended from the pins by the strands, it may be easily swung transversely in the base and may also be tilted vertically so that the operator may easily see egg cells reflected in the mirror and by reaching into the base with an implement having a hooked end remove surplus queen bee cells. A collar 25 which is preferably formed of resilient wire bent to define a loop having jaws 26 pivotally engaged in a bearing sleeve 27 is provided so that a spotlight 28 may be supported, as shown in Fig. 4, to direct its light towards the rear of the base and thereby illuminate the interior of the base and the egg cells in the lower portion of the body. Since the collar is pivotally connected with the bearing sleeve, the spotlight may be tilted vertically in order to direct its light upwardly. After the surplus queen bee cells have been removed, the reflector and the cells which drop upon it will be withdrawn from the base after releasing the hooks 23 from the pins 24 and the platform again set in place.

During the winter when the bees remain in the hive and the platform 6 is in its uppermost position shown in full lines in Fig. 1 and the portion of the base below the platform is packed and the closure 12 in place, it is desired to prevent too much cold air entering the hive through the small space between the platform and the lower edge of the front wall of the hive but at the same time allow sufficient air to enter for ventilating purposes and also allow the bees to determine whether or not the weather is mild enough to leave the hive when spring approaches. Therefore, I have provided a closure 29 which may be referred to as a winter closure or winter front. This closure or front consists of a strip or block of wood of sufficient width to extend the full width of the base, as shown in Fig. 2. Referring to this figure and to Fig. 1, it will be seen that the removable winter closure rests upon the platform 6 and has its rear end portion formed with an extension 30 which is of such dimensions that it will fit snugly into the space between the platform and the lower edge of the front wall of the body portion of the hive. Therefore, the entire space between the front wall of the hive and the platform will be filled by the extension and since the block projects upwardly into overlapping relation to the front wall of the hive a very good closure will be provided. The upper surface of the closure slopes towards the sides of the base and, therefore, rain water and water from melting snow or ice which may collect upon the block will drain towards the sides of the base. If desired, grooves may be formed in the upper surface of the block and guard strips may be provided along its front and rear edges to assist in guiding the water towards the sides of the base. When the closure is in place, it is desired to have a certain amount of air enter the hive for ventilation and also allow the bees to approach the entrance in order to determine whether or not the weather is mild enough for them to leave the hive. Therefore, I have provided the under face of the closure with grooves 31 which extend from its front to its rear edge in spaced relation to its sides and form passages allowing air to pass into the hive in order to ventilate it and through which bees may pass when they desire to determine whether or not the weather is mild enough for them to leave the hive. At their outer ends the grooves or passages are covered with wire screen 32, the meshes of which are large enough to allow the bees to pass out but sufficiently small to prevent mice or other rodents from entering the hive through these passages. It will thus be seen that, while the bees may move through the passages, they cannot be disturbed by rodents entering the hive. During the summer when the closure 12 is removed and the platform shifted to the lower supporting strips in the base, the winter closure is also removed and put away together with the closure 12 until again needed.

Having thus described the invention, I claim:

1. In a bee hive, a body, a base supporting said body and open at its front, upper and lower seats in said base, a platform supported upon one of said seats and projecting forwardly beyond said body, and a closure for the open front of said base adapted to be removably secured therein between the bottom of the base and platform when the platform is supported upon the upper seat.

2. In a bee hive, a body, a base supporting said body and open at its top and forward end, the walls of said base being provided with seats spaced one above another and the upper seat being disposed adjacent the top of the base, a removable platform resting upon a selected one of said seats and projecting forwardly beyond the body, a closure removably received in the forward end of said base between its bottom and said platform when the platform is supported in its uppermost position, and means to releasably secure said closure.

3. In a bee hive, a body, a base supporting said body and open at its top and forward end, the walls of said base being provided with seats spaced one above another and the upper seats being disposed adjacent the top of the base, a removable platform resting upon a selected one of said seats and projecting forwardly beyond the base and adjacent the forward end of the base having a groove extending transversely across its under face, the bottom of the base having its forward end reduced in thickness to provide a seat beneath said groove, and a closure for the forward end of said base removably received therein when said platform is in its uppermost position with its upper edge portion received in said groove and its lower edge portion seated in the seat at the forward end of the bottom of the base.

4. In a bee hive, a body, a base supporting said body and open at its top and front, a platform slidable into and out of the base through the open front thereof and when in place projecting forwardly from the body, and means in said base to support said platform in vertically adjusted positions whereby the platform may be retained in determined spaced relation below said body with its extended forward end constituting a landing stage for bees.

5. In a bee hive, a body, a base supporting said body and open at its top and front, a platform slidable into and out of the base through the open front thereof and when in place projecting forwardly from the body, means in said base to support said platform in vertically adjusted positions whereby the platform may be retained in determined spaced relation below said body with its extended forward end constituting a landing stage for bees, and a removable closure for the open forward end of said base receivable therein between its bottom and said platform when the platform is supported in its uppermost position.

6. In a bee hive, a body, a base supporting said body and open at its top and front, and a platform slidable into and out of the base through the open front thereof and when in place projecting forwardly from the body, the base being provided with means to support the platform in vertically adjusted spaced relation to said body.

7. In a bee hive, a body, a base supporting said body and open at its front, a platform in said base projecting forwardly beyond said body and spaced below the body, means to support the platform in vertically adjusted positions in the base and a winter closure resting upon said platform in front of said body and extending into the space between the body and platform for the full width thereof, said closure being formed with passages to permit bees to pass into and out of the hive when the closure is in place.

8. In a bee hive, a body, a base supporting said body and open at its front, a platform in said base projecting forwardly beyond said body and spaced below the body, and a winter closure resting upon said platform in front of said body in overlapping relation to the front of the body and having a rear extension fitting into the space between the platform and body, said closure having its under face formed with grooves constituting ventilating openings and passages through which bees may leave and enter the hive.

9. In a bee hive, a body, a base supporting said body and open at its front, a platform in said base projecting forwardly beyond said body and spaced below the body, and a winter closure resting upon said platform in front of said body in overlapping relation to the front of the body and having a rear extension fitting into the space between the platform and body, the portion of the closure in front of the body having its upper surface sloping towards the sides of the base, the under surface of said closure having grooves formed therein and constituting passages through which bees may leave and enter the hive.

In testimony whereof I affix my signature.

Miss GRACE LEE FENNO. [L. S.]